April 4, 1939.  C. CHILOWSKY  2,153,456

PHOTOSENSITIVE GAS APPARATUS

Filed May 19, 1937

Constantin Chilowsky.

Patented Apr. 4, 1939

2,153,456

UNITED STATES PATENT OFFICE 2,153,456

PHOTOSENSITIVE GAS APPARATUS

Constantin Chilowsky, Paris, France

Application May 19, 1937, Serial No. 143,490
In France May 28, 1936

10 Claims. (Cl. 200—52)

In my French Patent No. 795,681, of Sept. 7, 1935, corresponding to U. S. application Serial No. 40,657, filed September 14, 1935, I described a photo-sensitive apparatus based upon the action of light on a mixture of chlorine and hydrogen produced by the electrolysis of hydrochloric acid or of an acidulated solution of alkaline or alkali-earth chlorine salts producing variations of pressure of these gases as a function of variations of their illumination.

In this patent, I described, in particular, an embodiment of an apparatus of this kind, in which electrolysis took place inside chambers containing the various chemical substances, and with platinum-iridium electrodes. This alloy is chosen because it has the maximum resistance to the chemical attack of chlorine, the liquid employed being generally saturated with chlorine and the chamber further containing an excess of this gas. These electrodes are fed with a low direct current, generally constant, flowing continuously through the liquid.

I have found that when the apparatus is in the state of rest and no electrolytic current is flowing through the liquid, it may happen that, after a time, the electrodes undergo a slight attack, even when they are made of platinum iridium alloy. This phenomenon is disclosed by a more or less accentuated coloration of the liquid (which becomes slightly yellow, brown or red), due, as it may be supposed, to the presence in the solution of very small amounts of salts of platinum or iridium chloride.

Now, after a time, the accumulation of these salts in the liquid may influence, to a slight degree, the sensitivity of the apparatus by reducing the amount of chlorine in excess normally present in the chamber, which may be detrimental to the precision of working of the apparatus, especially in the case of measurement apparatus.

I also found that this slight dissolution of platinum and iridium takes place (chiefly if not exclusively) during the time the devices are being stored, or during their transportation when it lasts for a long time. On the contrary, it was found that this dissolution is practically reduced to zero during normal working of the apparatus, in the case of the electrolytic current being direct current, such as dissolution taking place, however, under the action of an alternating current.

I also found that this attack does not take place when the electrodes, or in a general manner all the parts of the apparatus made of platinum, are kept at a constant potential of a value approximating that of the potential necessary for the disengagement of the gases, and even at a potential lower than that just above mentioned.

I found, in a general manner, that any depolarization of the electrodes, and consequently any loss of gas (either chlorine, or hydrogen, according to a sign of the electrode) and, still more, the reversing of the polarity, are liable to produce and facilitate a slight dissolution of platinum and a resulting coloration of the electrolytic liquid.

This depolarization may be produced by a slow diffusion of the gases through the liquid, first in the case in which the electrodes are no longer kept under tension for a sufficiently long time, secondly when the electrodes are short-circuited on themselves in such manner as to produce the flow of a depolarization current, and thirdly in the case of a change of sign of the electrodes (or the application of an alternating current).

The object of the present invention is to obviate these drawbacks and to provide devices capable of ensuring the normal working of photosensitive gas apparatus and also of permitting transportation or storing up of the apparatus without any risk of an abnormal coloration and a modification of sensitiveness as might result therefrom.

The essential feature of the present invention consists in providing means for keeping the electrodes, constantly or with interruptions of relatively short duration, under a suitable tension, always in the same direction, this tension being preferably equal to, or slightly lower than, the tension of the electrolysis current.

It may also be slightly higher than the latter in such manner as constantly to have an electrolytic current, but provided the intensity of the current is kept at a very low value avoiding gas overpressure.

According to a first feature of the invention, I provide means for avoiding any reversing of the polarity. For this purpose, it is advisable to indicate, on all apparatus, in a definitive manner, the positive and negative terminals, and this despite the fact that, theoretically, the terminals of the apparatus are wholly interchangeable from other points of view.

According to a second feature, the electrical arrangement is such that the external circuit of the electrodes is never closed without a suitable potential difference (always in the same direction) being maintained at the terminals of the electrodes.

According to a third feature of the invention, in the case of a prolonged stopping of the electrolytic current (apparatus stored up, transportation to a long distance, and so on) the polarization of the electrodes (always in the same direction) is artificially maintained by a tension preferably little different from the potential of electrolysis, for instance by means of a battery giving a tension averaging one volt and a half, a very low current compensating the spontaneous depolarization of the electrodes (under the effect of the diffusion and convection through the liquid) being in this case allowed to flow through the liquid.

According to a fourth feature of the present invention, I continuously maintain, for instance by means of a source of current of a tension equal to, or higher than, the electrolytic tension, but provided with a suitable resistance in the case mentioned in the preceding paragraph, and especially in the case of normal working during the night, of the apparatus being stored up, of transportation, and so on, a low electrolysis current which is not capable, even in darkness, of dangerously increasing the pressure in the reaction chamber, this current being however sufficient for balancing, with an admissible gas pressure, the spontaneous depolarization of the electrodes.

Besides, it should be well understood that the invention is not limited to an uninterrupted application of a tension and that it is possible, within the scope of the invention, to apply the tension at suitable time intervals.

According to still another feature of the present invention, when storing or transporting photo-sensitive apparatus according to the invention, they are placed on rows of contacts inserted in a direct current circuit, of suitable tension, the apparatus being connected to these contacts in such manner as to be kept under a suitable tension.

According to still another feature of the present invention, I connect with each apparatus a suitable source of potential and more especially a dry battery. A practical embodiment of this feature consists in incorporating in each apparatus a dry battery placed inside the casing of the apparatus, or inside the box used for storing or transportation of the apparatus.

Other features of the present invention will be apparent from the following detailed description of some specific embodiments thereof.

Preferred embodiments of the present invention will be hereinafter described, with reference to the accompanying drawing, given merely by way of example, and in which.

Figure 1:
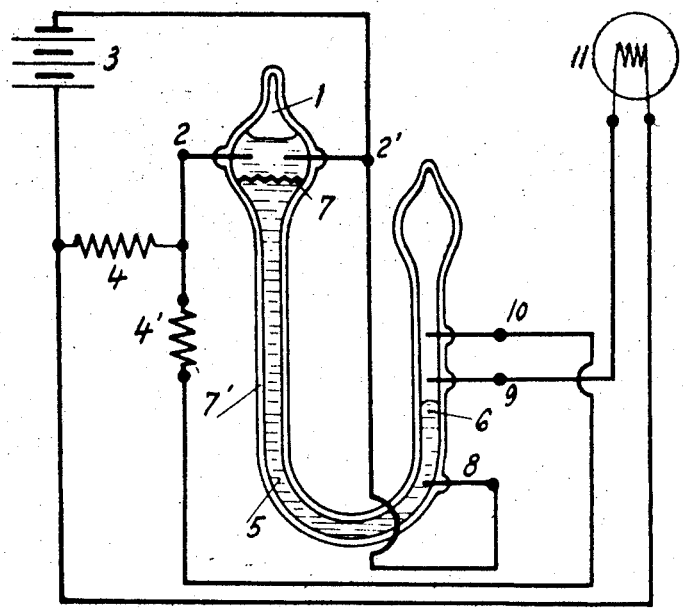
Fig. 1 shows an apparatus according to the invention constituting a photo-relay.

Referring first to Fig. 1, I have shown at 1 a bulb containing the electrolysis liquid, a portion of the volume of the bulb being reserved for the gases. I have shown at 2 and 2' the electrodes, at 3 the battery, and at 4 the resistance which permits of adjusting the value of the electrolysis current.

I have also shown at 5 a mercury column, at 6 the free meniscus thereof, and at 7 a corrugated membrane, for instance of platinum iridium, welded in the glass walls of the apparatus, and separating, in a fluidtight manner, the inside of the bulb and the mercury column present in the tube 1' which extends below said bulb.

Reference characters 8, 9 and 10 designate three electric contacts. Contact 9 is the working contact serving to switch on, for instance, lamp 11 when meniscus 6 reaches this contact. This closing of the contact takes place when the electrolysis gases which accumulate in darkness in bulb 1 exert, through membrane 7, a sufficient pressure upon the mercury column for causing it to reach contact 9. When darkness persists, meniscus 6 reaches contact 10, which short-circuits electrodes 2 and 2' through resistance 4', the latter being chosen, according to the invention, in such manner that the potential at terminals 2 and 2' drops below the potential necessary for the disengagement of the gases. The electrolytic current is practically stopped (with the exception of a very small current compensating the natural depolarization), the electrodes remaining however under a polarization tension which protects them against the attack above referred to.

Figure 2:
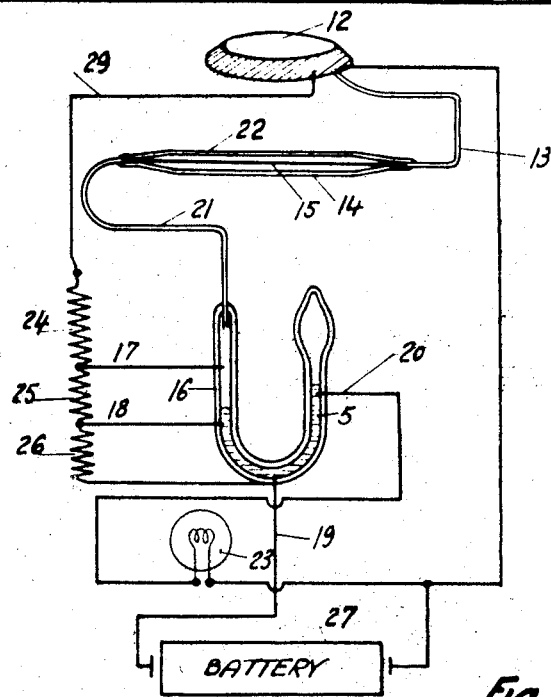
Fig. 2 shows another embodiment of a photo-relay according to the present invention.

In Fig. 2, I have diagrammatically shown another system including a different arrangement. The apparatus shown in this figure includes an electrolysis bulb 12, communicating through a tube 13, of platinum iridium, with a flat-shaped chamber formed by a thick glass plate 14 and a thin plate or blade 15, of glass or platinum iridium. Tube 16, which contains the mercury column 5 and the electric contacts 17, 18, 19 and 20, is connected, through tube 21, with a chamber formed between the above mentioned flexible membrane 15 and a second thick glass plate 22, the three plates 14, 15 and 22 being welded together along their periphery.

When, in darkness, the pressure in bulb 12 increases, it is transmitted through tube 13 and elastic membrane 15 to the mercury column 5, acting on this column through the intermediate of an inert gas filling tube 21, the space located between plate 15 and plate 22, and the upper part of tube 16.

When mercury reaches contact 20, it closes a circuit including, for instance, a lamp 25 which is switched on. The electrolytic current supplied by a battery 27 is automatically adjusted by three resistances 24, 25 and 26. When the apparatus is strongly illuminated, producing a reduced pressure in chamber 12, the left hand side portion of the mercury column 5 reaches contact 17 and the electrolytic current is adjusted by the small resistance 24 in such manner as to reach a relatively high value. When, under the influence of the reduction of illumination, the pressure on the inside of bulb 12, rises, the mercury column moves downwardly in the left hand branch of tube 16 and leaves contact 17. The electrolytic current is, from this time on, adjusted by the whole of the two resistances in series 24 and 25, and it is accordingly reduced to its normal value determined by the value of the luminous intensity for which it is desired to obtain the closing of the working contact 20.

When obscurity persists, the mercury column leaves contact 18 and the electrolytic current is adjusted by the whole of the resistances in series 24, 25 and 26, the lower terminal of the last mentioned resistance being connected to contact 19. Resistance 26 has a value which is very high and is calculated in such manner that the electrolytic current drops to a very low value, just sufficient for compensating the natural depolarization as above indicated, with a view to avoiding the attack on the electrodes.

In the case in which the apparatus serves automatically to control the lights of an automobile vehicle, mercury, practically leaves contact 18 for one night or even for only a portion of a night. In this case, resistance 26 may sometimes be dispensed with. However, in anticipation of long stays in darkness, this resistance 26 is extremely useful.

The storing, preservation, and transportation of the apparatus can be effected, for practical purposes, according to the invention, by replacing, for instance, battery 27 by an element such as a dry battery giving a tension averaging one volt and a half, insufficient for producing a disengagement of gases in bulb 12. It is only necessary to take the precaution of previously illuminating bulb 12 so as to create therein a reduced pressure sufficient for breaking the contact at 20.

Figure 3:
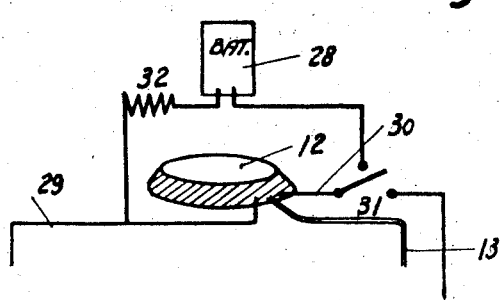
Fig. 3 is a partial view of a modification of the apparatus of Fig. 2.

In the modification shown by Fig. 3, in which only the upper part of the apparatus of Fig. 2 is represented, a dry battery 28, giving a tension of the order of magnitude of one volt and a half, is connected directly with the electrodes 29 and 30 of bulb 12 through a switch 31, permitting of switching onto these electrodes either the current of battery 27, according to the diagram of Fig. 2 (case of normal working of the apparatus) or the current of dry battery 28 (case of transportation or storing). Battery 28 may be constituted, as above stated, of a single element, for instance giving a current of one volt and a half, insufficient for disengaging and accumulating gases or, if desired, I may make use of several elements by connecting to the circuit a relatively high resistance 32, intended to reduce the current to a value sufficient for preventing depolarization.

According to the present invention, I may also apply the same method of preservation in general to all elements of platinum or platinum-iridium in contact with the liquid and the chlorine and, in particular, to the junction tube (such as 13 in Fig. 2) extending between the reaction chamber and the chamber located on one of the sides of the membrane.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus of the type described which comprises, in combination, a closed rigid vessel having a gas space adapted to be exposed to the action of light, a liquid in said vessel capable of being electrolytically transformed into at least two gases, chosen to combine together under the action of light with a reduction of the volume of the whole system of liquid and gases, two electrodes in said vessel immersed in said liquid, said liquid normally being capable of attacking said electrodes, an electrolytic circuit connected to said electrodes and including a source of current, said electrolytic circuit having a current flow sufficient to produce electrolysis of said liquid, an auxiliary circuit connected with said electrodes to modify the current flow of said electrolytic circuit and impress a current on said electrodes insufficient to produce electrolysis of said liquid, and means operatively associated with said vessel and responsive to variations in said volume for completing said auxiliary circuit when a predetermined degree of darkness exists, whereby attack on the electrodes by said liquid is prevented.

2. An apparatus of the type described which comprises, in combination, a closed rigid vessel having a gas space adapted to be exposed to the action of light, a liquid in said vessel capable of being electrolytically transformed into at least two gases, said gases being of such nature as to recombine under the action of light with a resulting reduction of the volume of the whole system of liquid and gases, two electrodes in said vessel immersed in said liquid, said liquid normally being capable of attacking said electrodes, an electrolytic circuit including a source of current connected to said electrodes and having a tension sufficient to produce electrolysis of said liquid, and means operatively associated with said vessel and said electrolytic circuit and responsive to variations in the volume of said system of liquid and gases for reducing the tension on said electrodes, for a predetermined degree of darkness, to a point insufficient to produce electrolysis of said liquid, whereby attack on the electrodes by said liquid is prevented.

3. An apparatus of the type described which comprises, in combination, a closed rigid vessel having a gas space adapted to be exposed to the action of light, a liquid in said vessel capable of being electrolytically transformed into at least two gases, said gases being of such nature as to recombine under the action of light and to build up a pressure in said vessel upon electrolysis in the absence of said light, two electrodes in said vessel immersed in said liquid, an electrolytic circuit connected to said electrodes and including a source of current, said electrolytic circuit having a current flow sufficient to produce electrolysis of said liquid and to build up a gas pressure in said vessel upon substantial decrease in the intensity of said light, and means responsive to variations in the pressure of the system of liquid and gases for reducing said current flow to said electrodes, for a predetermined degree of darkness, to a point insufficient to cause electrolysis, said means including an electric circuit connected with the electrodes for maintaining on said electrodes a slight current insufficient to raise the pressure in said vessel but sufficient to prevent depolarization of the electrodes under the action of diffusion or convection through the liquid.

4. An apparatus of the type described which comprises, in combination, a closed rigid vessel having a gas space adapted to be exposed to the action of light, a liquid in said vessel capable of being electrolytically transformed into at least two gases chosen to combine together under the action of light with a reduction of the volume of the whole system of liquid and gases, two electrodes in said vessel immersed in said liquid, an electrolytic circuit connected to said electrodes and including a source of current, said electrolytic circuit having a current flow sufficient to produce electrolysis of said liquid and to build up a gas pressure in said vessel upon substantial decrease in the intensity of said light, a plurality of contact members associated with said vessel, one of said contact members being connected with one of said electrodes, a resistance connected with another of said contact members and with the other of said electrodes, means responsive to variations in the pressure of said gases and liquid operable to complete an electric circuit between said contacts when a predetermined degree of darkness exists, said resistance permitting the maintenance of a slight current flow to said electrodes insufficient to produce electrolysis and raise the pressure in said vessel but sufficient to prevent depolarization of said electrodes under the action of diffusion or convection through said liquid.

5. An apparatus of the type described which comprises, in combination, a closed rigid vessel having a gas space adapted to be exposed to the action of light, a liquid in said vessel capable of being electrolytically transformed into at least two gases chosen to combine together under the action of light with a reduction of the volume of the whole system of liquid and gases, two electrodes in said vessel immersed in said liquid, an electrolytic circuit connected to said electrodes and including a source of current, said electrolytic circuit having a current flow sufficient to produce electrolysis of said liquid to build up a gas pressure in said vessel upon substantial decrease in the intensity of said light, a closed tube connected with said vessel, a mercury column in said tube movable in response to variations in the pressure in said vessel, contacts in said tube positioned to be engaged by said mercury column, a resistance connected with said electrolytic circuit and said contacts and arranged to be brought into play for a given position of said mercury column corresponding to a predetermined degree of darkness, said resistance, when connected with said electrolytic circuit, maintaining a slight current flow to said electrodes insufficient to raise the pressure in said vessel but sufficient to prevent depolarization of said electrodes under the action of diffusion or convection through the liquid.

6. An apparatus according to claim 5 in which said resistance is connected in shunt with said electrolytic circuit.

7. An apparatus according to claim 5 in which said resistance is connected in series with said electrolytic circuit.

8. An apparatus of the type described which comprises in combination, a closed rigid vessel having a gas space adapted to be exposed to the action of light, a liquid in said vessel capable of being electrolytically transformed into at least two gases chosen to combine together under the influence of light with a reduction of the volume of the whole system of liquid and gases, two electrodes in said vessel immersed in said liquid, said liquid normally being capable of attacking said electrodes, an electrolytic circuit for said electrodes including terminals connected to a source of current, said electrolytic circuit normally having a current flow sufficient to produce electrolysis of said liquid, and means responsive to changes in the volume of said system of liquid and gases for impressing on said electrolytic circuit, for a predetermined degree of darkness, a continuous current of constant polarity less than the normal current flow of said electrolytic circuit and insufficient to prevent electrolysis of said liquid, whereby attack on said electrodes by said liquid is prevented.

9. An apparatus of the type described, which comprises, in combination, a closed rigid vessel having a gas space adapted to be exposed to the action of light, a liquid in said vessel capable of being electrolytically transformed into at least two gases chosen to combine together under the influence of light with a reduction of the volume of the whole system of liquid and gases, two electrodes in said vessel immersed in said liquid, said liquid normally being capable of attacking said electrodes, an electrolytic circuit connected to said electrodes, a current source of sufficient potential to cause electrolysis of said liquid, and an auxiliary current source, said auxiliary current source having a potential insufficient to produce electrolysis of said liquid but sufficient to prevent said liquid from attacking said electrodes, said electrolytic circuit having terminals for connection to either of said current sources.

10. An apparatus of the type described which comprises, in combination, a closed rigid vessel having a gas space adapted to be exposed to the action of light, a liquid in said vessel capable of being electrolytically transformed into at least two gases chosen to combine together under the influence of light with a reduction of the volume of the whole system of liquid and gases, two electrodes in said vessel immersed in said liquid, an electrolytic circuit for said electrodes including terminals connected to a source of current of sufficient potential to cause electrolysis of said liquid, an auxiliary current source, said auxiliary current source having a potential insufficient to produce electrolysis of said liquid, connections from said auxiliary current source to said electrodes, and a switch operable to disconnect said electrodes from said source of current and to connect said electrodes with said auxiliary current source, and vice versa.

CONSTANTIN CHILOWSKY.